Figure 1:
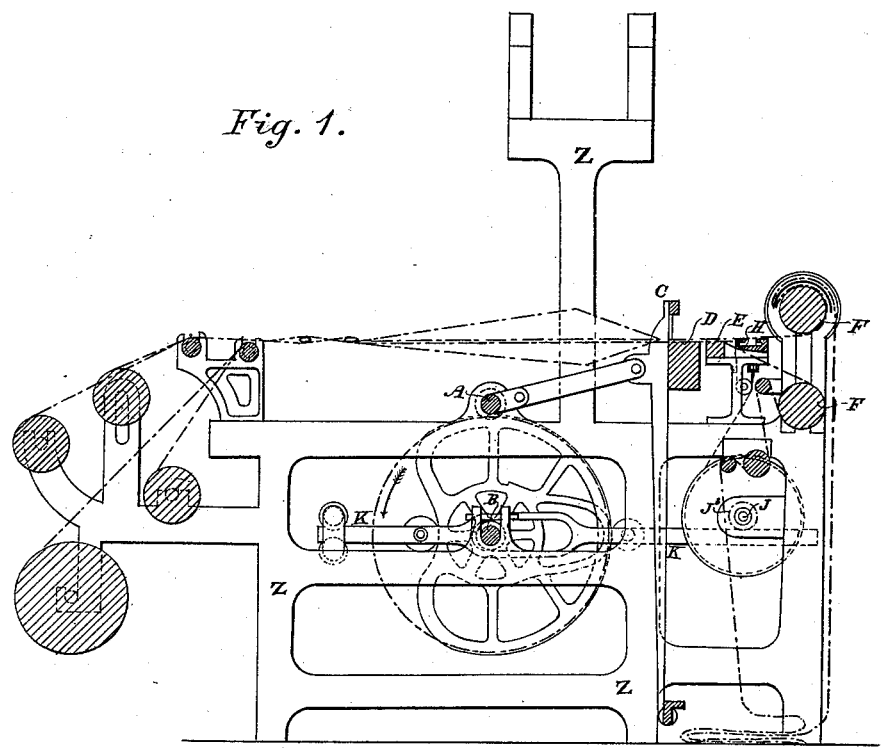

(No Model.) 5 Sheets—Sheet 1.
S. C. LISTER & J. REIXACH.
MACHINERY FOR CUTTING DOUBLE PILE FABRICS.
No. 268,418. Patented Dec. 5, 1882.

Witnesses
Wm Tannes
E. Abshagen

Inventors:
Samuel C. Lister
José Reixach
By their Attorneys
Baldwin, Hopkins & Peyton N. PETERS, Photo-Lithographer, Washington, D. C.

(No Model.) 5 Sheets—Sheet 2.
S. C. LISTER & J. REIXACH.
MACHINERY FOR CUTTING DOUBLE PILE FABRICS.
No. 268,418. Patented Dec. 5, 1882.

(No Model.) 5 Sheets—Sheet 3.

S. C. LISTER & J. REIXACH.
MACHINERY FOR CUTTING DOUBLE PILE FABRICS.

No. 268,418. Patented Dec. 5, 1882.

Witnesses
Wm Tanner
E. Abshagen

Inventors
Samuel C. Lister
José Reixach
By their Attorneys
Baldwin, Hopkins & Peyton

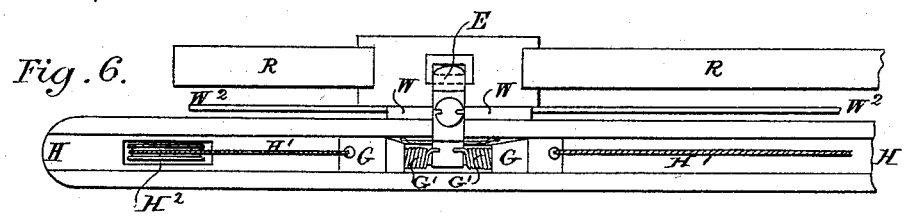
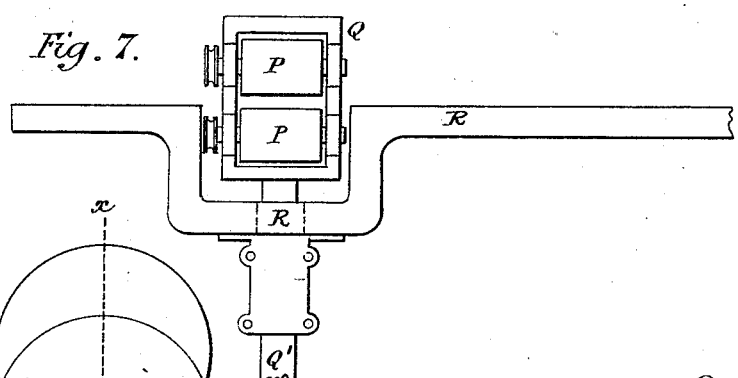
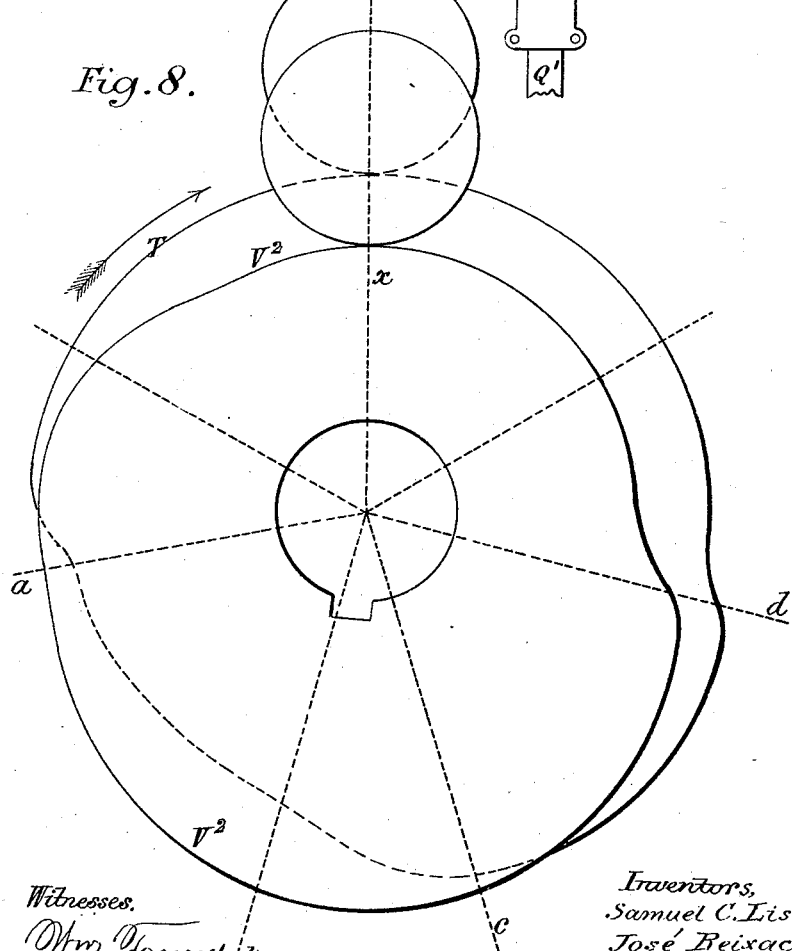
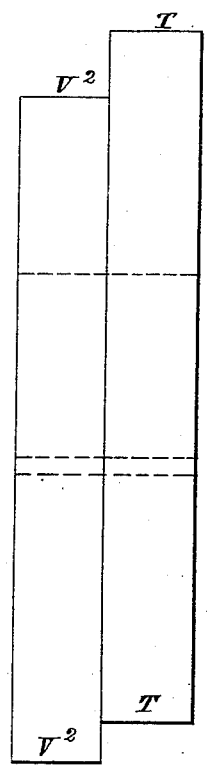

(No Model.)

5 Sheets—Sheet 5.

S. C. LISTER & J. REIXACH.
MACHINERY FOR CUTTING DOUBLE PILE FABRICS.

No. 268,418.

Patented Dec. 5, 1882.

WITNESSES

INVENTORS
Samuel C. Lister,
José Reixach
By their Attorneys

UNITED STATES PATENT OFFICE.

SAMUEL C. LISTER AND JOSÉ REIXACH, OF MANNINGHAM, NEAR BRADFORD, COUNTY OF YORK, ENGLAND.

MACHINERY FOR CUTTING DOUBLE-PILE FABRICS.

SPECIFICATION forming part of Letters Patent No. 268,418, dated December 5, 1882.

Application filed April 20, 1882. (No model.)

*To all whom it may concern:*

Be it known that we, SAMUEL CUNLIFFE LISTER and JOSÉ REIXACH, subjects of the Queen of Great Britain, residing at Manningham, near Bradford, in the county of York, England, have invented certain new and useful Improvements in Machinery for Cutting Double-Pile Fabrics, of which the following is a specification.

These improvements relate to machinery for cutting asunder two pieces of velvet or other pile fabric woven face to face at one operation, the said pieces being connected together by means of the pile-threads, upon severing which two separate and distinct pieces of pile fabric are produced. The cutting knife or blade employed for severing the pile is, as heretofore, (see, for examples, the English patents of S. C. Lister, No. 470, of February 11, 1868, and George Davies, No. 2,429, of November 1, 1858,) mounted upon a carriage working in a transverse slide, and is drawn backward and forward by means of cords, and when the knife comes to rest at one end of the slide it enters between sharpening-rollers, one above and the other below it. The rollers are, as heretofore, mounted so that they can be raised and lowered. Either the upper or the lower roller is first brought into contact with the edge of the knife, and the knife is at the same time caused to travel slowly across the roller from one end of it toward the other. The other roller is then brought into contact with the knife, and the knife is caused to travel slowly back, by which means the edge of the knife is perfectly and evenly sharpened.

In our application for a patent, filed January 13, 1881, No. 23,907, we describe devices for giving to the knife a slight to-and-fro movement at the time when it is being sharpened. Our present improvements relate to improved means for giving to the knife this slight to-and-fro movement at the time when it is being sharpened, and have for their object to give these movements to the knife with greater certainty and regularity; and the improvements also relate to an improved construction of the sharpening-rollers. The rollers are made concave, and are covered with a cylinder of vulcanized india-rubber or similar soft elastic material. This cylinder of elastic material is again covered with soft leather, upon the outer surface of which is applied a composition of emery, rotten stone, or such like material and tallow, or any similar composition ordinarily used for coating grinding-rollers and other surfaces used for sharpening razors and similar tools.

The drawings annexed show our improved mechanism as used in connection with a loom for weaving the double-pile fabric; but it might be used separately for cutting a double-pile fabric woven in a separate and distinct loom.

Figure 2:
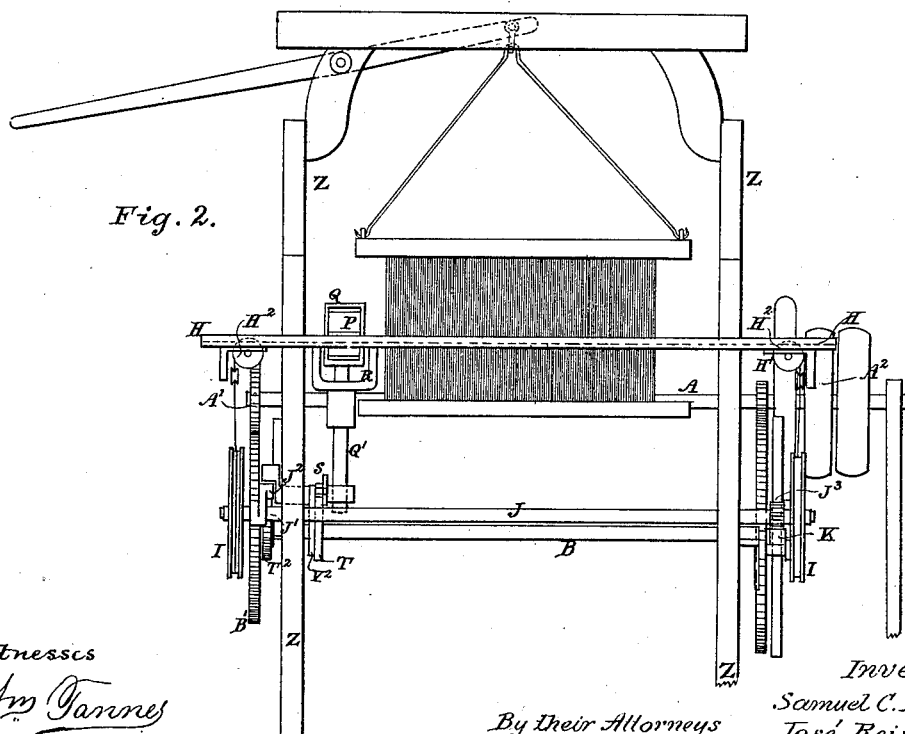
Figure 3:
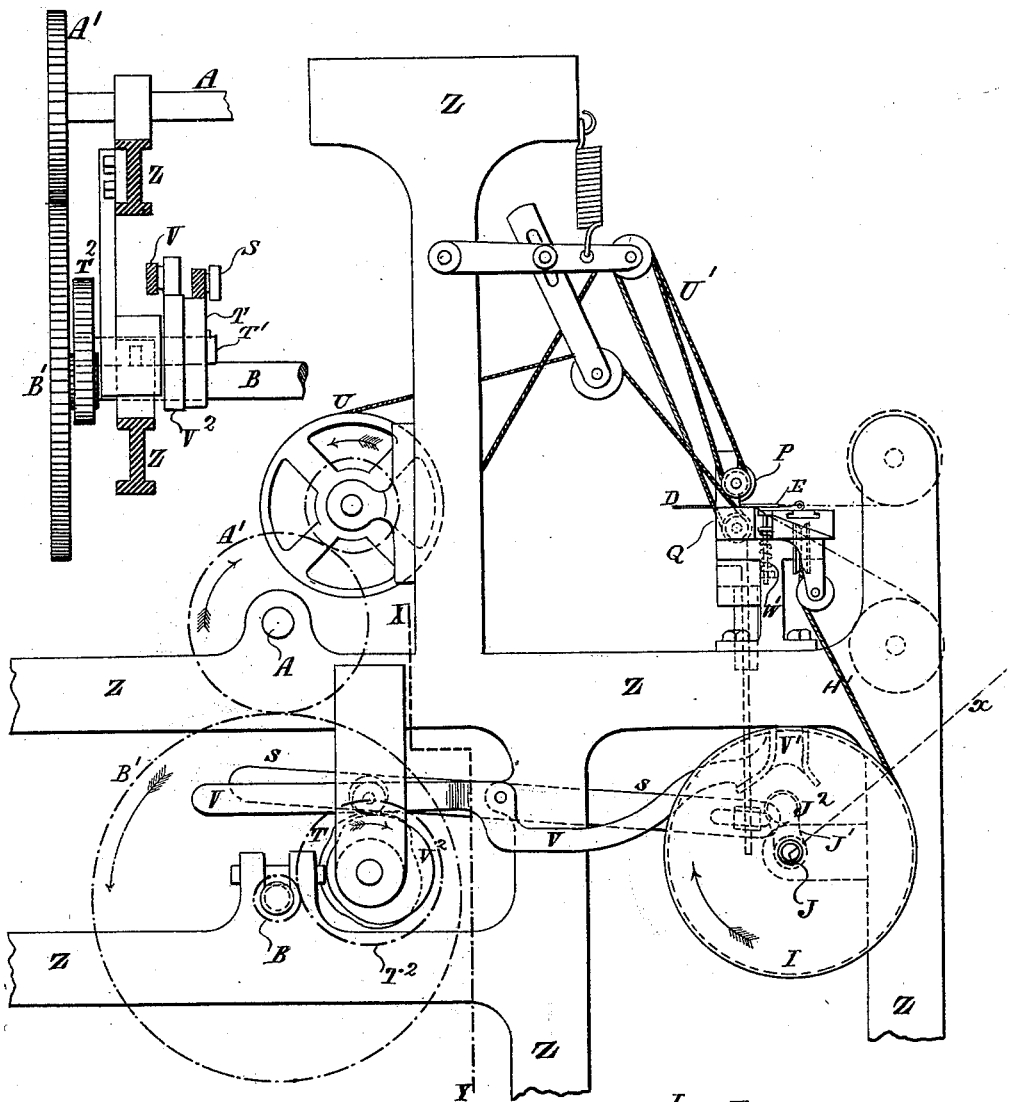
Figure 4:
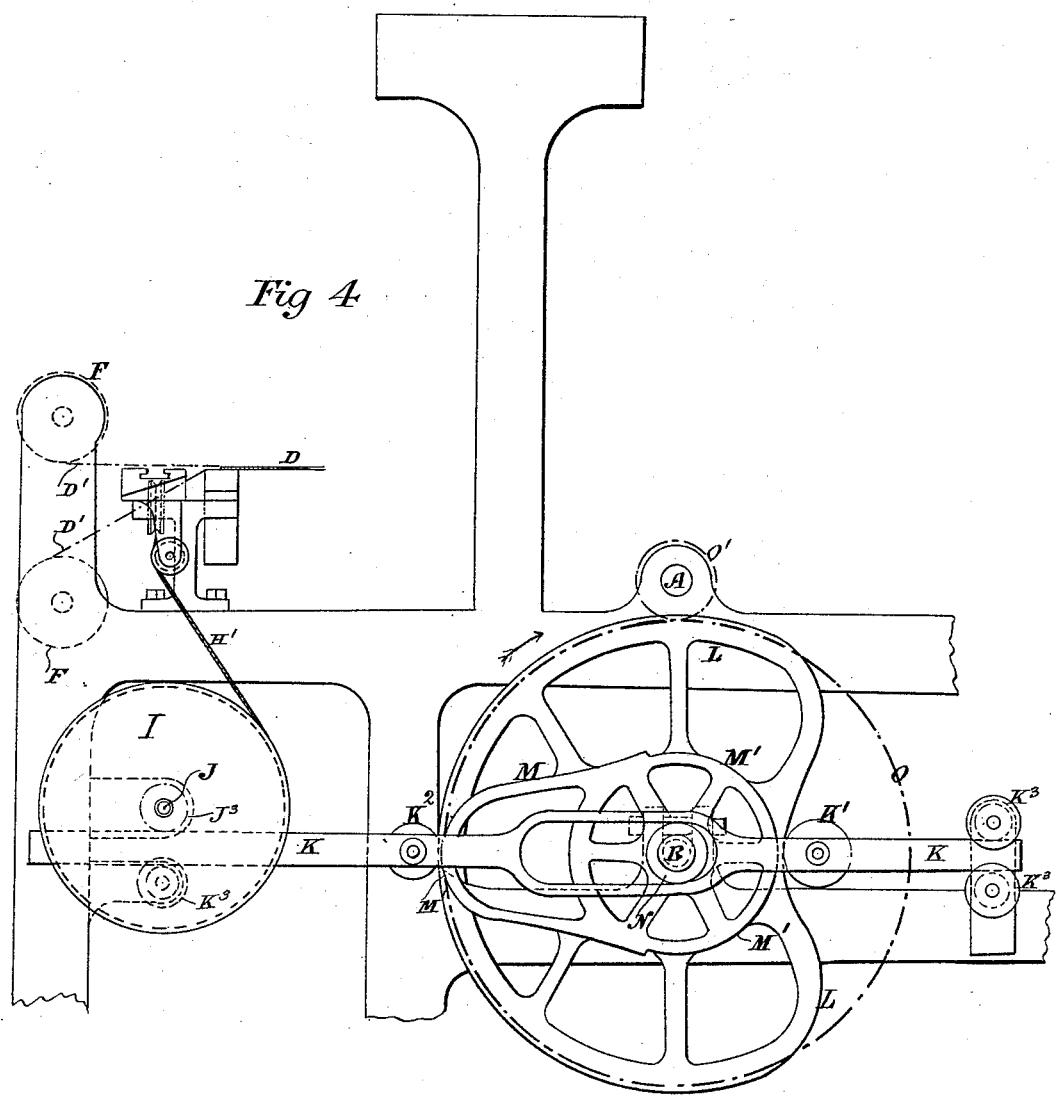
Figure 5:
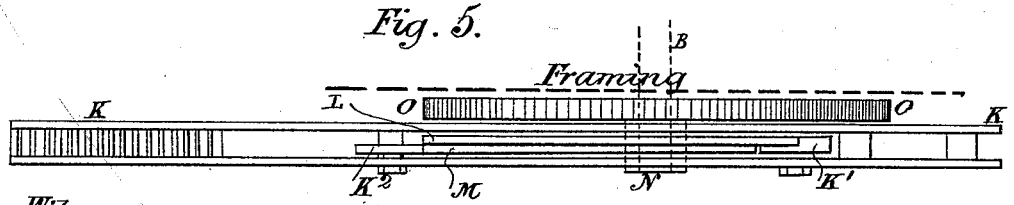
Figure 10:
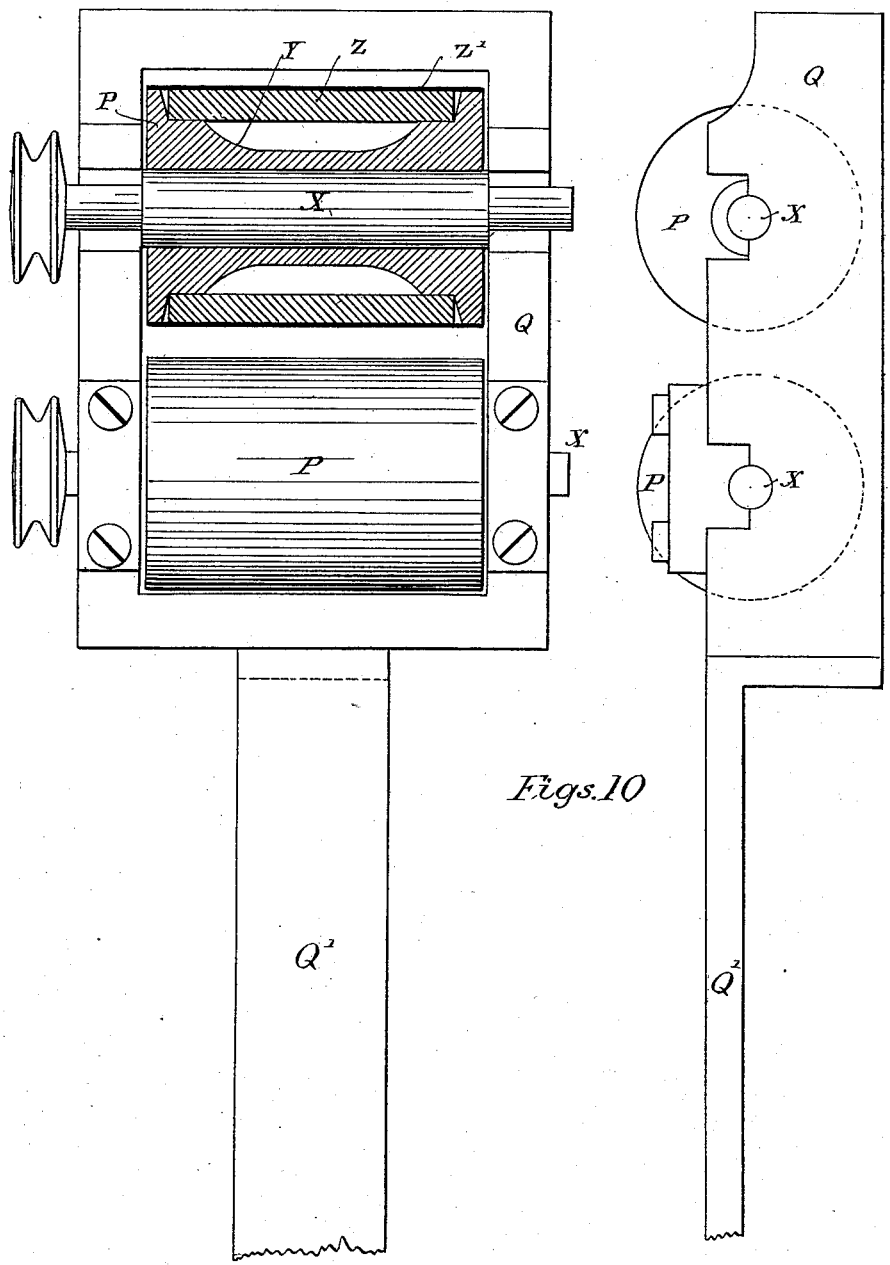

Figure 1 shows a vertical longitudinal section of a loom for weaving two pieces of pile-fabric face to face with our improved mechanism added thereto. Fig. 2 is a front view of the same, with many of the parts removed. These views are shown in order that the position occupied in the loom by the mechanism used for sharpening the knife by which the pile-warps are severed may be clearly seen. Fig. 3 shows separately on a larger scale a side view of the parts for effecting the sharpening of the knife. Fig. 4 shows separately on this larger scale the parts which are on the opposite side of the loom to that shown in Fig. 3, and by which the to-and-fro traversing motion is given to the knife to move it across from side to side of the loom. Fig. 5 is a plan view of the cams and rack shown at Fig. 4, and of the toothed wheel by which the cams are revolved. Fig. 6 is a plan view of the end of the velvet-rail and knife at the side of the loom where the sharpening of the knife takes place. Fig. 7 is a front view of this part of the velvet-rail, showing the sharpening-rollers and the frame which carries them. The sharpening-rollers are not shown in Fig. 6. Fig. 10 shows on a larger scale views of the sharpening-rollers and of part of the frame which carries them. Figs. 8 and 9 show on a corresponding scale a face view and edge view of the cams for raising and lowering the sharpening-rollers and for giving the slight traverse to and fro to the knife at the time when it is being sharpened.

A is the crank or driving-shaft of the loom, and B is the picking-shaft. The two shafts are geared together by the toothed wheels A' B', and the shaft A is driven by a driving-belt passing over the driving-pulley A², which is fast on the shaft, as shown at Fig. 2.

C is the batten, worked to and fro by the crank-shaft A.

D is the uncut double-pile fabric, the two portions thereof being woven face to face.

E is the knife by which the pile is severed, the same being shown in plan at Fig. 6.

D' are the two fabrics after being cut one from the other.

F are rollers over and under which the two fabrics are led away. These rollers receive a slow continuous revolving motion by a train of gear from the picking-shaft B, as described in the application for a patent, No. 23,907. This train of gear is not shown in the drawings, in order that the other parts of the mechanism may be more clearly seen.

The cutting-knife E is carried by a slide, G, which can be slidden to and fro along a groove formed in the top of the fixed knife-rail H. This rail extends from one side of the loom to the other, and is fixed to the two side frames.

Two cords, H', are attached to the slide G, one being led downward over a pulley, H², (see Figs. 2 and 6,) at one end of the knife-rail H, and the other being led downward over a similar pulley at the opposite end of the knife-rail. The ends of the cords are attached, one to a pulley, I, at one end of a shaft, J, the other to a similar pulley, I, at the opposite end of this shaft. The two cords are led onto the pulleys I in opposite directions, so that when the shaft J is turned one cord is wound onto one pulley and the other cord unwound from the other pulley, whereby by giving a partial turn to the shaft J first in one direction and then in the other, the knife is caused to traverse to and fro along the knife-rail from side to side of the loom. This is the ordinary way of giving motion to the knife, and forms no part of the invention. The shaft J receives its motion from a toothed rack, K, which gears with a pinion, J³, upon said shaft. (See Figs. 2, 4, and 5.) The rack K is moved endwise to and fro by a double cam, L M, acting upon two rollers, K' K², carried by the rack. The rack is supported by friction-rollers K³, as shown at Fig. 4. The double cam L M is fixed upon a short hollow axis, N, upon which is also a toothed wheel, O. The hollow axis N is mounted upon one end of the picking-shaft B, and can turn freely around it, and the toothed wheel O gears with a pinion, O', on the crank or driving shaft, and is revolved thereby. The crank-shaft A makes six revolutions for each revolution of the cam L M.

The revolving rollers P, by which the knife is sharpened, are, as heretofore, carried by a frame, Q, having a descending stem, Q', which passes downward through a guide-socket secured to the under side of a rail, R. This rail passes from side to side of the loom, and is called the "velvet" rail, as the velvet rests above the top of this rail while it is being cut.

The descending stem Q' is at its lower end connected to a lever, S, (see Fig. 3,) acted upon by a cam, T, as shown at Figs. 3 and 3ˣ, which latter is a vertical section taken on the line X Y, Fig. 3. The cam is also shown in Figs. 8 and 9. This cam is carried by an axis, T', driven at the same speed as the cam L M before mentioned, and receiving its motion from a pinion on the picking-shaft, B, gearing into a toothed wheel, T², which is fast upon the axis T'. The position of the toothed wheels and of the cams upon their shafts is clearly seen in Fig. 3ˣ. The frame of the machine is marked Z. The sharpening-rollers are given a continuous revolving motion by an endless cord, U', driven by a pulley, U, which is itself driven by a pinion upon it gearing into a toothed wheel, A', on the driving or crank shaft A of the loom, as shown at Fig. 3.

All the above parts are well known, and their action is well understood, the same being also described in the application for a patent, No. 23,907.

The way in which we give endwise motion to the knife during the time that the sharpening-rollers are acting upon it is shown at Fig. 3.

The rock-shaft J has upon it an arm, J', carrying a roller, J². When the other parts of the machine are in the position shown this arm would in practice be caused to extend in the direction of the radial line x, Fig. 3; but when, by the action of the double cam L M upon the rock-shaft J, the knife, after being traversed to and fro across the loom, is brought to rest between the sharpening-rollers, the arm J' and roller J² are in the position shown in Fig. 3. A cam, V', formed at one end of a bent lever, V, by a groove made with a flaring or funnel mouth, as shown, is then, by the action of a cam, V², operating upon the rear end of the lever, caused to descend and act on the roller J², so as to give a partial turn to the rock-shaft J, and when the cam end of the lever V rises the rock-shaft J will be turned back again by the action of the cam L M and rack, and thus the slight endwise movement is given to the knife at the time of sharpening. The cam V² is fast with the cam T on the axis T' and turns with it. The lower sharpening-roller acts first on the under side of the knife, and while it is acting upon it the additional traverse is given to the knife across the surface of that roller. The upper sharpening-roller is next brought against the top edge of the knife, and while it is acting upon it the knife is moved back to its former position. It has then been sharpened on both sides, and during the next half-revolution of the cams L, M, and T and V² is traversed to and fro across the loom to sever the pile of the double-pile fabric being woven. In order to allow of the above-described slight turning movement being given to the shaft J at the time that the knife is being sharpened, part of cam M of the double cam L M is cut away at M', so that when the knife has been brought to rest at the side of the loom where the sharpening takes place this portion of the cam is toward the roller K², a space being between them, so that the rack K can have the necessary slight further movement in one direction given to it quite independently of the double cam L M as the rock-shaft is actuated by means of the lever V, as above explained. The return rock of the rock-shaft J is due to the action thereon of the double cam and rack when the cut-away portion of the cam M passes from the roller K².

The drawings show the various parts in the position they assume when the knife, after being sharpened, has been moved across to the opposite side of the loom and is about to be moved back again to the side of the loom at which the sharpening-rollers are placed.

The positions of the cams L M and T V² at this time are shown clearly in Figs. 4 and 8, respectively, the line $x$ in the latter figure radiating upwardly. The cams being rotated at the same speed and in directions indicated by the arrows, the knife, after acting to sever the pile threads and at the end of slightly more than one-sixth of a revolution of the cams, will come to rest between the sharpening-rollers with the first presented portion of the cut-away part M' of the cam M opposite the roller K². The cams T V² then act on levers S V, the one marked V² causing the end of the lever V, which has formed on it the cam-groove V', to descend onto the truck J² on the crank-arm J' of the axis J and turn this arm somewhat farther in the same direction that it was immediately before turning in—that is, in the direction of the arrow shown in Fig. 3. At the same time the cam marked T turns the lever S and lifts the sharpening-rollers to bring the lower roller against the under side of the knife. This takes place during the time that the parts of the cams between the radial lines $a\,b$ are acting. Next, when the parts of the cams between the lines $b$ and $c$ are acting the knife remains at rest and the rollers are lowered so as to bring the top sharpening-roller against the top of the knife. Next, when the parts of the cams between the lines $c$ and $d$ are acting, the knife is traversed back to its former position. It is now sharpened and ready to be traversed across the machine.

In order that when the sharpening-rollers are brought against the knife they may press upon it with an approximately uniform pressure, the knife-holder is at its end hinged to the slide G and pressed downward by coiled springs G', so that when the bottom roller is lifted against the under side of the knife the knife is held down to it by these springs. When the top roller is brought down onto the top edge of the knife the knife rests upon a plate, W, held up by springs W', as seen at Figs. 3 and 6. The springs allow the plate to yield when the sharpening-roller presses the knife downward.

W² is a fixed straight edge upon which the knife rests as it moves toward the velvet to cut. It serves as a guide to keep the knife at the proper level until it has entered between the two pieces of velvet.

Each sharpening-roller, as shown at Fig. 10, is formed of a metal spindle, X, surrounded by a wooden roller, Y, concave on its exterior. Z is a tube of india-rubber surrounding the roller Y, and Z' is a covering of thin leather, having its surface coated with a suitable grinding composition and cemented at its ends to the ends of the wooden rollers Y. The advantage derived from forming the roller in this way is that when it bears against the knife its elastic surface readily yields and makes the cutting-edge of the knife of a rounded form, just as though a concave-sharpening roller were being used for the purpose, but by reason of its elasticity it answers much better than a concave sharpening-roller of unyielding material.

We claim as of our own invention—

1. The combination of the knife, mechanism for actuating it to sever the fabric, the sharpening-rollers, means by which they are actuated to bring them alternately into contact with the opposite sides of the knife, the arm on the rock-shaft of the knife-actuating mechanism, the lever provided with a cam acting on said arm, and the cam acting on the lever, substantially as and for the purpose hereinbefore set forth.

2. The combination of the knife E, the knife-bar H, the cords H', the rock-shaft J, its pulleys, the pinion on the rock-shaft, the rack, means for operating the rack, the revolving sharpening-rollers, the arm on the rock-shaft, the lever provided with the cam acting on the rock-shaft arm, and the revolving cam operating the lever, all acting together substantially as described.

3. The sharpening-rollers, each formed with a concave roller covered with a cylinder of vulcanized india rubber or like elastic material, over which is an outer covering of leather provided with the grinding material, substantially as described.

SAMUEL CUNLIFFE LISTER.
JOSÉ REIXACH.

Witnesses:
H. F. KILLICH,
   *Notary Public, Bradford.*
WM. THORNTON,
   *Solicitor's Clerk, Bradford.*